J. F. O'CONNOR.
COMBINED COMPENSATING LINK AND SHOCK ABSORBER.
APPLICATION FILED FEB. 16, 1918.
1,300,472.
Patented Apr. 15, 1919.
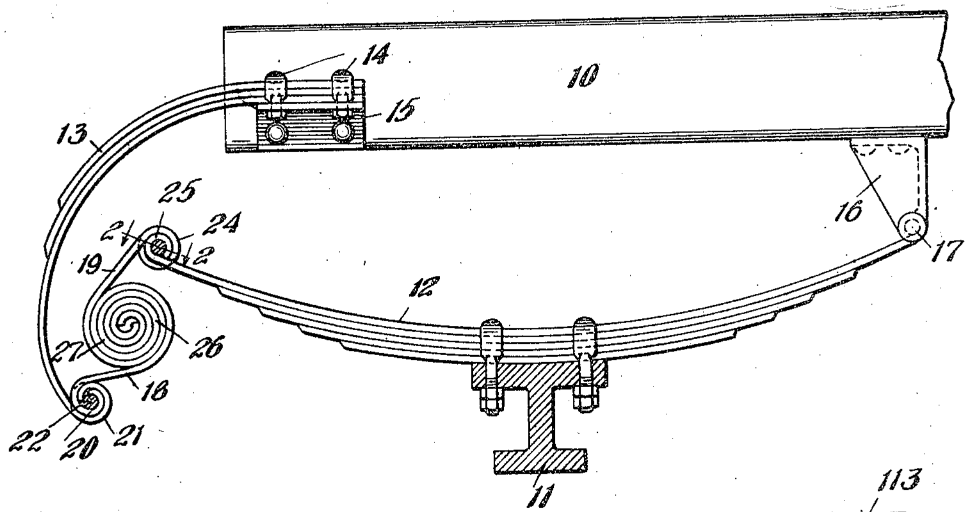
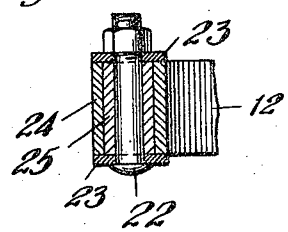
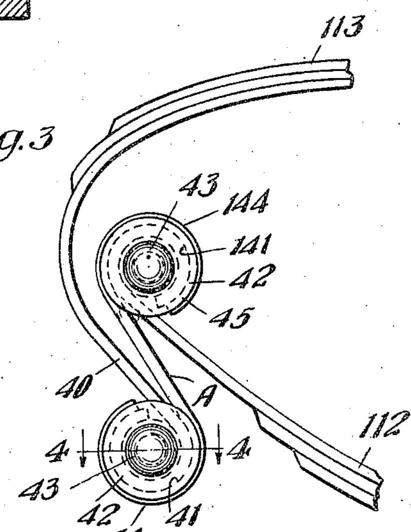
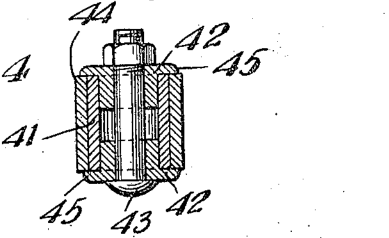
INVENTOR.
*John F. O'Connor*
BY *Geo. I. Haight*
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

COMBINED COMPENSATING LINK AND SHOCK-ABSORBER.

1,300,472. Specification of Letters Patent. Patented Apr. 15, 1919.

Application filed February 16, 1918. Serial No. 217,513.

*To all whom it may concern:*

Be it known that I, JOHN F. O'CONNOR, a citizen of the United States, residing at Chicago, in the county of Cook and State of Illinois, have invented a certain new and useful Improvement in Combined Compensating Links and Shock-Absorbers, of which the following is a full, clear, concise, and exact description, reference being had to the accompanying drawings, forming a part of this specification.

This invention relates to improvements in combined compensating link and shock absorber.

In the manufacture of automobiles, it is now substantially a universal custom to employ compensating or swinging links to connect the main springs of the vehicle to thereby permit the necessary relative movements between the axles and chassis of the vehicle. Also, most automobiles are now equipped with so-called "shock absorbers" to absorb the excessive shocks incurred when the vehicle strikes a sharp depression or hump.

The object of my invention is to combine in a single structure such a shock absorber and compensating link to thereby minimize the number of parts, simplify the construction, and decrease expense.

In the drawing forming a part of this specification, Figure 1 is a side elevation, partly in section, showing a portion of an automobile chassis and axle having my improvements employed in connection therewith. Fig. 2 is a detail, sectional view, taken substantially on the line 2—2 of Fig. 1. Fig. 3 is a view corresponding to Fig. 1, illustrating another embodiment of the invention. And Fig. 4 is a detail, sectional view, taken on the line 4—4 of Fig. 3.

Referring first to the construction shown in Figs. 1 and 2, 10 denotes the side frame of an automobile chassis, 11 a rear axle, 12 the semi-elliptic main spring secured at its center to the axle 11, 13 the quarter-elliptic main spring rigidly secured to the chassis 10 by the clips and brackets 14 and 15, and 16 the bracket secured to the chassis 10 and to which one end of the semi-elliptic spring 12 is pivotally connected, as indicated at 17. The arrangement of parts so far described is or may be of any desired or well known construction.

The usual custom heretofore, has been to employ an ordinary link between the adjacent ends of the main springs 12 and 13, said link being pivotally connected to both and to then utilize an auxiliary shock absorber between the chassis 10 and axle 11. In carrying out my invention, however, I employ a combined compensating link and shock absorber which, as shown, preferably consists of two spring steel plates 18 and 19. The plate 18 at its lower end is curled, as indicated at 20, so as to fit within the correspondingly curled end 21 of the spring 13 and over a bolt 22 on which are carried washers 23—23. In this connection, it will be understood that the sectional view shown in Fig. 2 is equally applicable to the connection between the plate 18 and spring 13 as it is to the connection between the plate 19 and spring 12. At its upper end, the spring steel plate 19 is curled, as indicated at 24, so as to fit over the correspondingly curled end 25 of the main spring 12 and the parts are held in this instance also by a bolt 22 and washers 23, as shown in Fig. 2. At their inner ends, the spring plates 18 and 19 are spirally coiled, as indicated at 26 and 27, the number of turns in the spirals being dependent upon the desired shock absorbing capacity of the link. These spiral coils 26 and 27 are interleaved, as clearly indicated in Fig. 1.

In operation, it is evident that my combined compensating link and shock absorber will perform all the necessary functions of the usual compensating link. At the same time, it is apparent that frictional shock absorbing capacity will be obtained by the action of the spiral coils 26 and 27, one upon the other, as the forces tend to separate the adjacent ends of the main springs 12 and 13.

In the construction illustrated in Figs. 3 and 4, 112 and 113 denote the main springs of the vehicle corresponding to the springs 12 and 13 shown in the other figures. In Figs. 3 and 4, however, the end 40 of the longest plate of the spring 113 is provided with a coil or convolution 41 which fits over two plugs 42—42 carried on a bolt 43. The longest plate of the spring 112 has a similar coil 141 fitting over plugs similar to the plugs 52 and also mounted on a bolt 43. In this construction, the combined compensating link and shock absorber A preferably consists of a single plate of spring steel having a single coil 44 at its lower end fitting the adjacent coil 41, and at its upper end a similar coil 144 is provided fitting the coil 141 of the spring 112. At both ends of the link, the plugs 42—42 are provided with flanges 45 which overlap the edges of the nested coils 41 and 44 on the one hand and 141 and 144 on the other hand.

As will be evident, the link A performs all the functions of the usual compensating link and at the same time additional frictional shock absorbing capacity will be generated due to the swinging movements of the link and the tendency of the end coils of the member A to straighten out or uncurl from the coiled ends of the main springs 112 and 113.

I claim:

1. In a vehicle, the combination with two main shock absorbing springs, of a compensating link pivotally connected to the ends of said springs, said link including a spring plate having an integral portion therein coiled about an axis parallel to the axes of pivotal connection between the link and said main springs, said coiled portion being adapted to frictionally slide upon an associated part to provide auxiliary friction shock absorbing capacity.

2. The combination with two main shock absorbing springs of a vehicle, of a compensating link pivotally connected to adjacent ends of said springs, said link including two elements, one of which is attached to one of said main springs and the second to the other of said main springs, said elements having integral intercoiled sections arranged for frictional sliding action.

In witness that I claim the foregoing I have hereunto subscribed my name this 7th day of Feb., 1918.

JOHN F. O'CONNOR.